(12) United States Patent
Barsness et al.

(10) Patent No.: US 7,130,838 B2
(45) Date of Patent: Oct. 31, 2006

(54) QUERY OPTIMIZATION VIA A PARTITIONED ENVIRONMENT

(75) Inventors: Eric L Barsness, Pine Island, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 10/660,144

(22) Filed: Sep. 11, 2003

(65) Prior Publication Data

US 2005/0060285 A1   Mar. 17, 2005

(51) Int. Cl.
*G06F 17/30* (2006.01)
(52) U.S. Cl. .......................................................... 707/2
(58) Field of Classification Search .............. 707/1–10, 707/100–104.1, 200–206
See application file for complete search history.

(56) References Cited

U.S. PATENT DOCUMENTS

2003/0093442 A1*  5/2003  Mogi et al. ................. 707/203
2005/0187917 A1*  8/2005  Lawande et al. ............... 707/3

* cited by examiner

*Primary Examiner*—Diane D. Mizrahi
(74) *Attorney, Agent, or Firm*—Patterson & Sheridan (57) ABSTRACT

Systems, methods, and articles of manufacture for improving the efficiency of executing a query are provided. Queries frequently issued in a primary processing environment (e.g., a primary logical partition) may be run in a background processing environment (e.g., a background logical partition) with different access plans to determine the access plan that results in the least execution time. For some embodiments, in an effort to avoid executing queries that may have an adverse system-wide impact, selected queries may be analyzed in the background processing environment prior to being executed. This analysis may be performed to ensure the execution time of the query will not exceed a specified threshold, and/or will not result in excessive contention when executed in the primary processing environment.

23 Claims, 6 Drawing Sheets

QUERY OPTIMIZATION VIA A PARTITIONED ENVIRONMENT

CROSS-REFERENCE TO RELATED APPLICATIONS

The present invention is related to the commonly owned, co-pending U.S. patent application Ser. No. 10/360,397 entitled "Patterned Based Query Optimization," filed Feb. 6, 2003, herein incorporated by reference.

BACKGROUND OF THE INVENTION

1. Field of the Invention

The present invention generally relates to data processing and more particularly to query optimization by executing queries in a backup environment.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

Generally, the DBMS includes a query optimizer component configured to determine the manner in which queries will be processed. The primary task of the optimizer is to determine the most efficient way to execute each particular query against a database. To this end, the optimizer determines an access plan for use in executing the query against the database. In general, the access plan contains low-level information indicating precisely what steps the system is to take to execute the query (e.g., using an index, a hash table, bit map, etc.). For any given query, there are a large number of possible access plans that may be chosen. Conventional optimizers are generally configured to determine the best access plan for each query they encounter, based on cost comparisons (i.e., estimated resource requirements, typically in terms of time and space) of available access plans. In selecting the access plan (and comparing associated costs), the optimizer may explore various ways to execute the query. For example, the optimizer may determine if an index may be used to speed a search, whether a search condition should be applied to a first table prior to joining the first table to a second table or whether to join the tables first. In determining the best access plan, optimizers may also group queries based on similarities and use the same access plan for queries that are similar.

In processing simple queries, choosing an access plan may be a rather simple task. However, as queries become increasingly complex, the complexity of choosing an access plan may increase accordingly, as the optimizer may have to take account of many different variables to determine the most efficient access plan. Even so, when optimizing large and complex queries, due to processing limitations of the optimizer, the access plan selected by the optimizer may not in actuality be the most efficient access plan. In fact, unless the queries are actually run with the different access plans to examine their execution time, there may be no definite way of determining the best access plan.

Accordingly, there is a need for an improved method of optimizing query execution, preferably that involves the actual execution of queries using different access plans to determine the most efficient one.

SUMMARY OF THE INVENTION

The present invention generally provides methods, articles of manufacture, and systems for optimizing queries.

One embodiment provides a method of optimizing the execution of queries in a system. The method generally includes monitoring queries executed in a primary processing environment, selecting a query to be optimized, from the monitored queries, generating a plurality of access plans for the selected query, and determining an optimal access plan by executing the query in a background processing environment using the generated access plans.

Another embodiment provides a method of executing queries in a logically partitioned system having at least one primary partition and at least one background partition. The method generally includes receiving a query to be executed in the primary partition, analyzing the query in the background partition to generate one or more performance measures, and executing the query in the primary partition only if the one or more performance measures fall within predefined performance criteria.

Another embodiment provides a computer readable medium containing a program for optimizing query execution which, When executed by a processor, the program performs operations generally including monitoring queries executed in a primary processing environment, selecting a query to be optimized, from the monitored queries, generating a plurality of access plans for the selected query, and determining an optimal access plan by executing the query in a background processing environment using the generated access plans.

Another embodiment provides a logically partitioned computer system generally including at least one primary partition, at least one background partition, a first executable component running on the primary partition and a second executable component running on the background partition. The first executable component is generally configured to monitor queries executed in the primary partition, select a query to be optimized, from the monitored queries, and send the selected query to the background partition for determination of an optimal access plan. The second executable component is generally configured to receive the selected query, generate a plurality of access plans for the selected query, and determine an optimal access plan by executing the query in the background partition using the generated access plans.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally is directed to systems, methods, and articles of manufacture for improving the efficiency of executing a query. In addition to running optimizers to determine an access plan for each issued query, queries frequently issued in a primary processing environment may be run in a background processing environment with different access plans to determine the access plan that results in the least execution time. For some embodiments, in an effort to avoid executing queries that may have an adverse system-wide impact, selected queries may be analyzed in the background processing environment prior to execution. This analysis may be performed to ensure execution time of the query will not exceed a specified threshold, and/or will not result in excessive contention when executed in the primary processing environment.

As used herein, the term access plan generally refers to any type of information indicating what steps the system is to take to execute a query including, but not limited to, information such as indexes to use, an order of applying search conditions, joining tables, etc. Further, in some instances, an access plan may include multiple sets of steps, where each set of steps may be regarded as an individual access plan. However, to facilitate understanding, the following description will refer to the multiple sets of steps, taken as a whole, as a single access plan. As used herein, the term background processing generally refers to any type of processing that does not significantly impact primary (i.e., foreground) processing. As an example, background processing may be performed using free processing cycles of unused/unassigned processors in a multi-processor system, or free cycles of processor used for foreground processing, for example, during idle times. As a particular, but not limiting application example, embodiments below will be described with reference to background processing on a logically partitioned system in which multiple processors are allocated among one or more primary and background partitions.

One embodiment of the invention is implemented as a program product for use with a computer system such as, for example, the computer system 110 of the data processing environment 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Exemplary Application Environment

Figure 1:
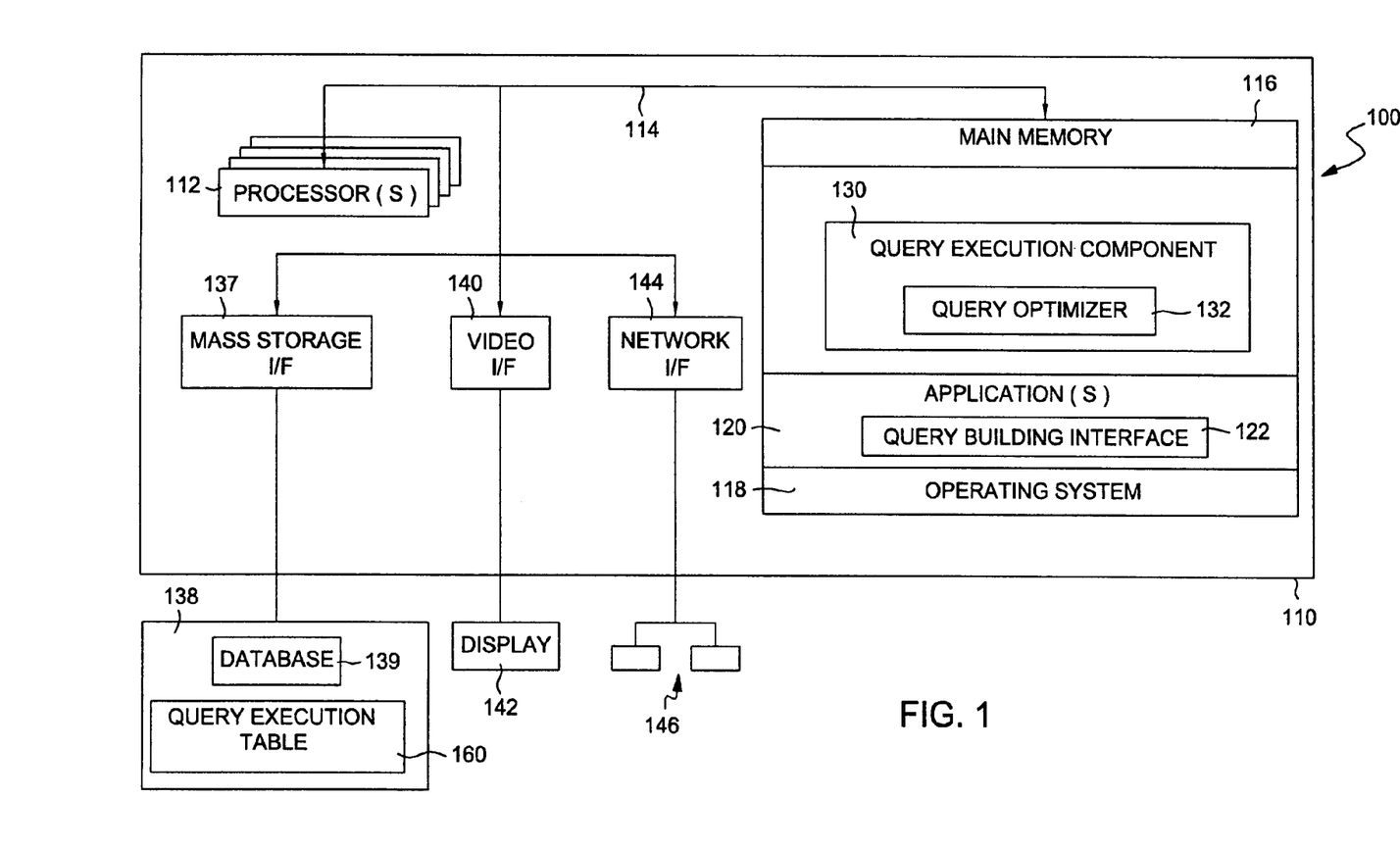
FIG. 1 is a computer system illustratively utilized in accordance with the present invention.

Referring now to FIG. 1, the data processing environment 100 is shown. In general, the data processing environment 100 includes a computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer iSeries 400 available from International Business Machines of Armonk, N.Y.

The computer system 110 could include a number of operators and peripheral systems as shown, for example, by a mass storage interface 137 operably connected to a direct access storage device (DASD) 138, by a video interface 140 operably connected to a display 142, and by a network interface 144 operably connected to the networked devices 146. The display 142 may be any video output device for outputting viewable information. The networked devices 146 may be any combination of any type networked devices, such as networked servers, networked printers, and network accessed storage (NAS) devices.

Figure 2:
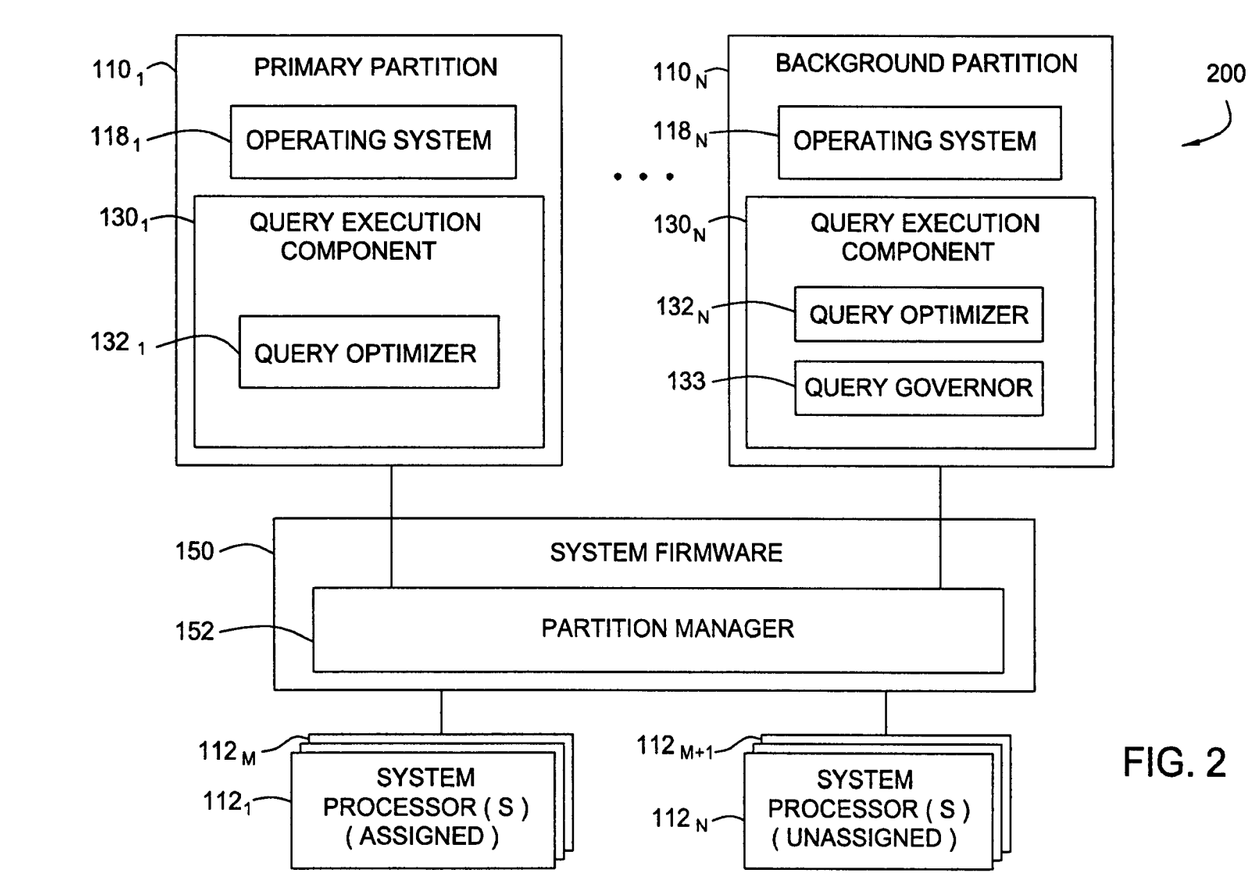
FIG. 2 is a logically partitioned computer system illustratively utilized in accordance with the present invention.

Computer system 110 is shown comprising one or more processors 112 which may be allocated among one or more logical partitions (as shown in FIG. 2) of a computer system and may obtain instructions and data via a bus 114 from a main memory 116. The processors 112 could be any processor adapted to support the methods of the invention. The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, main memory 116 may be considered to include memory physically located elsewhere in a computer system 110, for example, any storage capacity used as virtual memory or stored on a mass storage device (e.g., DASD 138) or on another computer coupled to the computer system 110 via bus 114.

The main memory 116 is shown configured with an operating system 118. The operating system 118 is the software used for managing the operation of the computer system 110. Examples of the operating system 118 include UNIX, Microsoft Windows®, and the like. As illustrated, the main memory 116 further includes at least one application 120 and a query execution component 130. The application 120 and the query execution component 130 are software products comprising a plurality of instructions that are resident at various times in various memory and storage devices in the computer system 110. When read and executed by one or more processors 112 in the computer system 110, the application 120 and the query execution component 130 cause the computer system 110 to perform the steps necessary to execute steps or elements embodying the various aspects of the invention.

The application 120 (and more generally, any requesting entity, including the operating system 118) is configured to run (i.e., issue/execute) queries against a database 139 (illustratively shown as resident in the DASD 138) via the query execution component 130. The queries issued by the application 120 may be created and/or specified by a user via a query building interface 122, which may be included with the application 120. The queries may be generated (e.g., by a user) via the query building interface 122 by specifying query conditions, for example, through one or more a graphical user interface (GUI) screens. The application 120 may send the generated queries to the query execution component 130 for execution. As illustrated, the query execution component 130 may include a query optimizer 132 for optimizing received queries prior to execution.

In accordance with aspects of the present invention the query execution component 130 may be generally configured to examine information regarding optimizations performed on prior executions of a query. The executions may have been performed in a backup environment for testing purposes (e.g., performed by an idle/unassigned processor or on free cycles of a primary processor). As previously described, a backup environment may refer to free cycles of one or more processors 112, for example, obtained via a power-on-demand arrangement (in which processing power is incrementally purchased by a customer).

In any case, information regarding optimizations performed previously on selected queries may be stored in a query execution table 160. For example, the query execution table 160 may include a set of records containing queries and their associated optimal access plans, along with corresponding execution times, as well as other information regarding previously the queries, such as estimated amounts of contention. For some embodiments, rather than include only the optimal access plan, the query execution table may include a list of access plans and corresponding execution times (that may be searched to determine an optimal access plan).

An Exemplary Logically Partitioned System

As illustrated in FIG. 2, some embodiments may utilize one or more background partitions in a logically partitioned computer system for performing query optimizations. FIG. 2 illustrates a logically partitioned computer system comprising one or more logical partitions 110, including at least one primary partition $110_1$ and at least one background partition $110_N$. The primary partition $110_1$ may handle primary computing functions, while the background partition $110_N$ may be used to perform additional functions, such as query execution and testing described herein.

As illustrated, each partition 110 may have an operating system 118 and a query execution component 130 for executing queries. As illustrated, a set of processors 112 may be assigned to the one or more logical partitions 110. For example, processors $112_1$–$112_M$ may be assigned to primary partitions, white processors $112_{M+1}$–$112_N$ may be unassigned (and thus available to background partitions). Depending on the exact configuration, one or more processors 112 may be dedicated to a given partition or one or more of the processors 112 may be shared among multiple partitions 110.

Logical partitioning is indeed logical rather than physical. A general purpose computer suitable for logically partitioning (such as that shown in FIG. 1) typically has physical data connections such as buses running between a resource in one partition and one in a different partition, and from a physical configuration standpoint, there is typically no distinction made with regard to partitions. Generally, logical partitioning is enforced by a layer of system firmware 150, referred to herein as a partition manager 152, although there may be a certain amount of hardware support for logical partitioning, such as hardware registers which hold state information. The partition manager 152 may include functions (e.g., messaging functions) used for communication between partitions. In other words, while there is nothing, from a hardware standpoint, which prevents a task executing in partition $110_1$ from writing to an I/O device in partition $110_N$, the partition manager 152 (and possibly associated hardware) prevents access to the resources in other partitions.

An Exemplary Relational View

Figure 3:
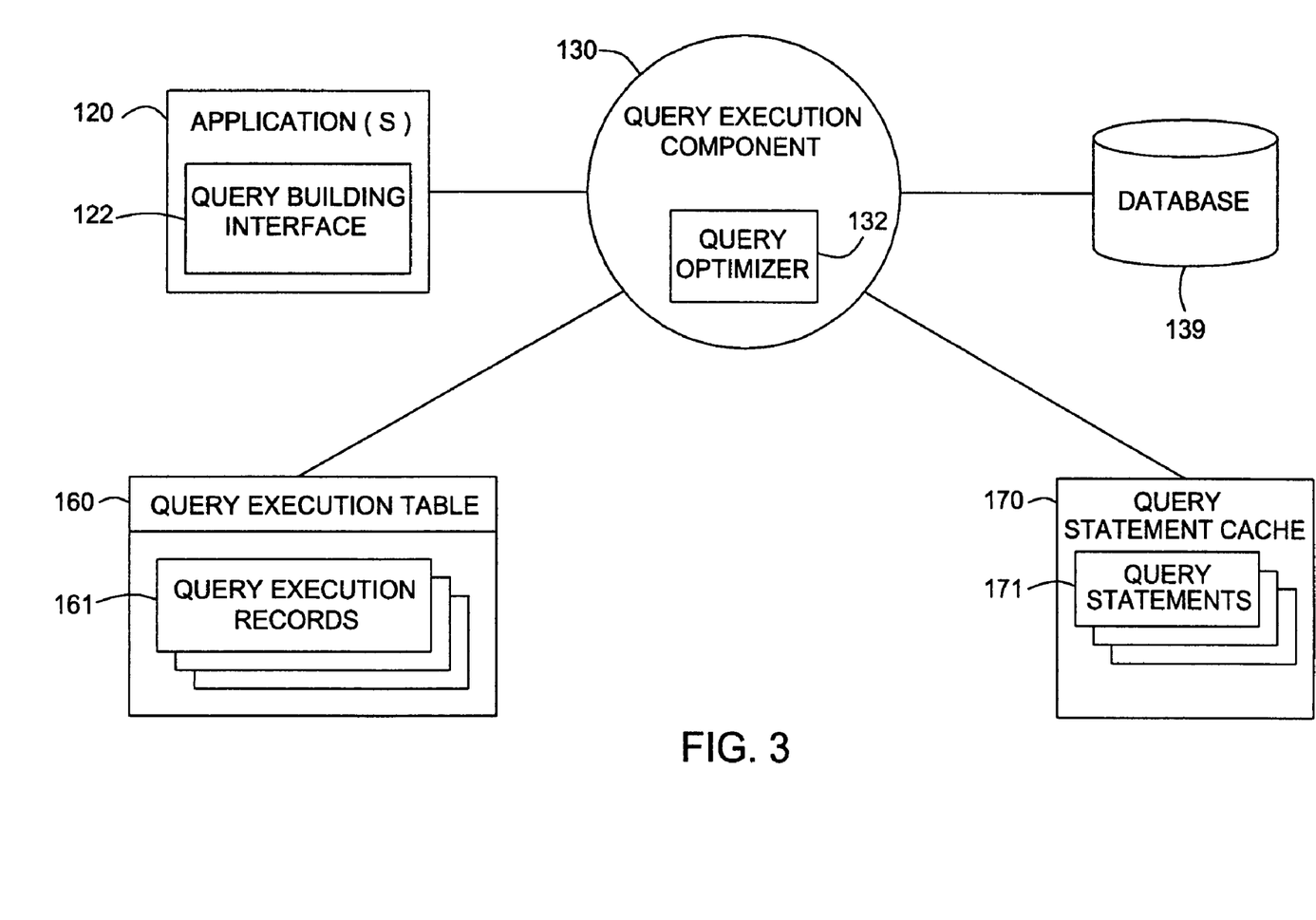
FIG. 3 is a relational view of software components according to one embodiment of the present invention.

In general, queries may be generated and executed in the primary partition $110_1$ and tested, or evaluated, in the background partition $110_N$. FIG. 3 illustrates a relational view of software components, for example, of a primary partition, such as an application 120, query execution component 130, database 139, and query execution table 160, according to one embodiment of the invention. In general, in response to receiving a query from the application 120 (or any requesting entity), the query execution component 130 may be configured to generate an appropriate access plan, via the query optimizer 132.

Issued queries may also be monitored and stored in a query statement cache 170. A testing component, for example, on a background partition may periodically access the query statement cache 170 and perform optimizations on query statements 171 stored therein. For example, query statements 171 stored in the query statement cache 170 may be periodically examined in an effort to identify which queries are used often and are, therefore, candidates for background optimization. In other words, optimizing frequently used queries should result in a greater improvement in system performance than optimizing queries used less often. Similarly, for some embodiments, the execution times of queries may also be stored in the cache and used to identify candidates for background optimization. In other words, optimizing simple queries that execute quickly may result in only minimal improvements in system performance.

In either case, once queries have been run in the background to determine optimal access plans, it may no longer be necessary to generate access plans with the query optimizer 132, which may enhance system performance by speeding query execution. As illustrated, the query execution table 160 may include a set of query execution records 161, each of which may contain an optimal access plan selected from prior background testing of the same query, the corresponding execution time, and/or other information for the query. Alternatively, the execution time corresponding to each access plan tested may be stored in query execution records 161, such that the query optimizer 132 may search the records 161 for the optimal access plan. Regardless, for some embodiments, each query execution record 161 may correspond to a single query and its related information.

For some embodiments, however, in addition to (or instead of) the query execution table, a grouped query table may also be created that include a set of grouped query records, each of which contains a set of access plans used for prior executions of a group of similar queries. In general, the queries within a query group may be related in that their optimizations are in all likelihood the same or similar. In other words, the optimizer 132 would likely determine the same access plan, or set of access plans for each query within a query group. As an example, queries within a query group may share a common set of criteria (e.g., SQL WHERE clauses), that causes the query optimizer 132 to generate the same or similar access plans. An advantage to query grouping is that by monitoring the execution of a relatively small number of queries access plans for executing a relatively large number of queries may be selected. The concept of query grouping is described in detail in the commonly owned, co-pending application Ser. No. 10/360,397, entitled "Patterned Based Query Optimization," filed Feb. 6, 2003, herein incorporated by reference.

Exemplary Operations For Background Optimization

Figure 4A:
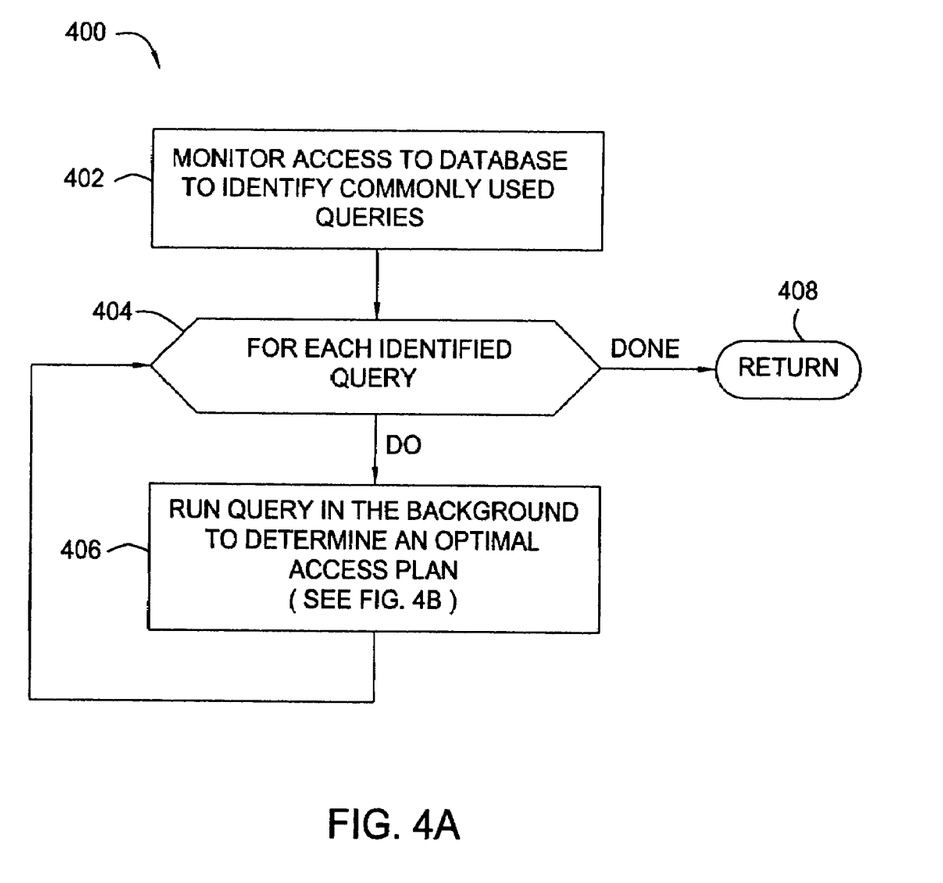
FIGS. 4A and 4B are flow charts illustrating exemplary operations for determining an optimal access plan for a query according to one embodiment of the present invention.

FIG. 4A is a flow diagram of exemplary operations 400 for background query optimization that may be performed, for example, on primary and background partitions,. The operations 400 begin at step 402 by monitoring access to the database to identify most often used queries. For example, saved query statements 171 contained in a system-wide statement cache 170, along with the number of times each query statement 171 is issued, may be examined to identify queries used most often. As previously described, query execution times may also be examined to determine which queries should be optimized in the background.

In either case, once queries to be optimized in the background are identified, at step 404, a loop of operations is performed to optimize each query in the background. In other words, as illustrated, at step 406, each selected query may be run in the background to determine an optimal access plan. For example, the selected query may be sent to a background partition for execution using several different access plans. In an effort to minimize the impact on system performance (e.g., in a primary partition), queries executed in the background may be run against a replicated version of the originally targeted database. For example, all the data targeted by the query under test may be non-intrusively replicated in the background to be used for testing purposes only. In either case, once the operation 406 has been performed for each identified query, the result (e.g., an updated query execution table 160), may be returned at step 408.

Figure 4B:
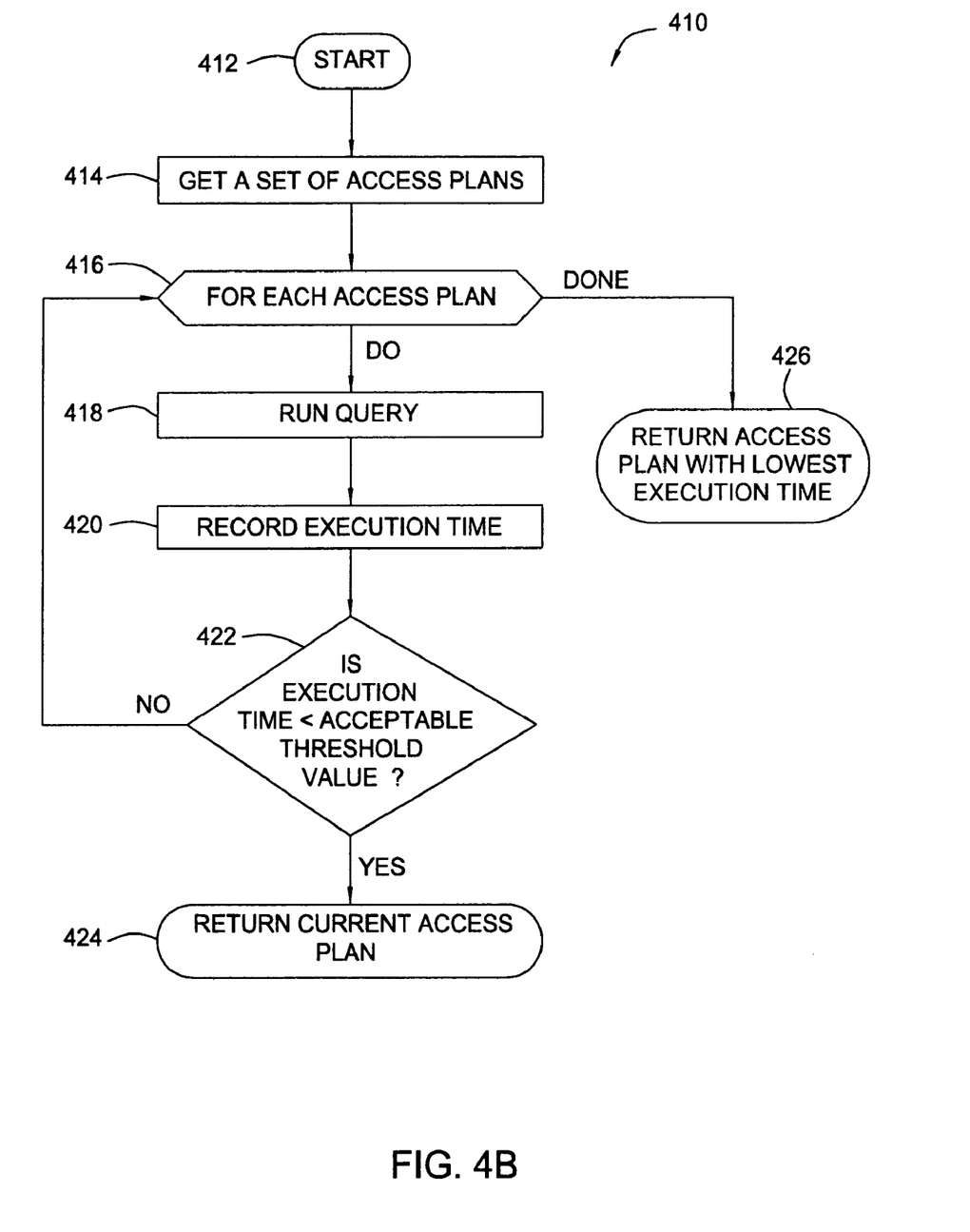

FIG. 4B illustrates exemplary operations 410 that may be performed in the background for selecting an access plan with the least execution time. The operations 410 begin at step 412, for example, by receiving an identified query (e.g., from the query statement cache 170, or directly from a primary partition). At step 414, a set of access plans is generated for the identified query, for example, by a query optimizer 132 running in background partition.

A loop of operations (418–422) to be performed for each access plan is entered, at step 416. For each access plan, the query is executed at step 418 and the execution time is recorded at step 420. In some cases, rather than run through all access plans, in an effort to minimize testing time, an acceptable threshold or "goal" execution time may be provided, such that an access plan resulting in an execution time below this threshold is deemed sufficiently optimal. Therefore, at step 422, the execution time is examined to determine whether it is less than a predetermined acceptable threshold value and, if so, the current access plan is returned, at step 424. Otherwise, the operations (418–422) are repeated for the next selected access plan. After the operations (418–422) have been performed for each access plans (with none resulting in an execution time below the threshold), the access plan with the lowest execution time is returned, at step 426.

In addition to (or instead of) examining the execution time after running the query to determine whether it is less than a predetermined threshold value, the execution time may also be examined while the query is being executed, to ensure the execution time does not exceed a predetermined threshold (e.g., a timeout period). For example, a query governor 133 may keep track of time during the query execution and halt the operation, if the time exceeds a predetermined value. When the query governor halts an execution for taking too much time, the corresponding access plan may be marked accordingly and the operations 410 may return to step 416 to evaluate the next access plan.

While it is generally desirable to select an access plan that results in a fast execution time, it may also be desirable to select a safe access plan (e.g., an access plan that reliably results in an execution time below a predetermined threshold level). For example, it may be undesirable to select an access plan that results in a fast execution under some system conditions, but an unacceptably long execution time other system conditions. Therefore, for some embodiments, operations similar to those shown in FIG. 4B may be performed repeatedly in order to establish a "history" of execution times corresponding to each access plan. For example, the operations may be repeated immediately or at different times in an effort to execute a query using each access plan under different system conditions. In either case, after executing a query with each access plan a suitable number of times to establish a sufficient execution history for each access plan, an access plan may be selected as optimal only if it never results in an execution time above a predetermined threshold.

Background Preprocessing

For some embodiments, it may be desirable to evaluate queries in the background prior to primary execution, in an effort to determine if executing the query will have adverse effects on a system. For example, some "ad-hoc" queries may be very complex, or may not have been written efficiently, either of which may result in excessive execution times. By examining ad-hoc queries and sending complex queries (where complexity is, for example, determined by parsing the text of the query) to the background partition, excessive execution times may be avoided. Further, in some cases, queries may access a large number of rows and columns, creating excessive contention with other issued queries accessing the same rows and columns.

Figure 5:
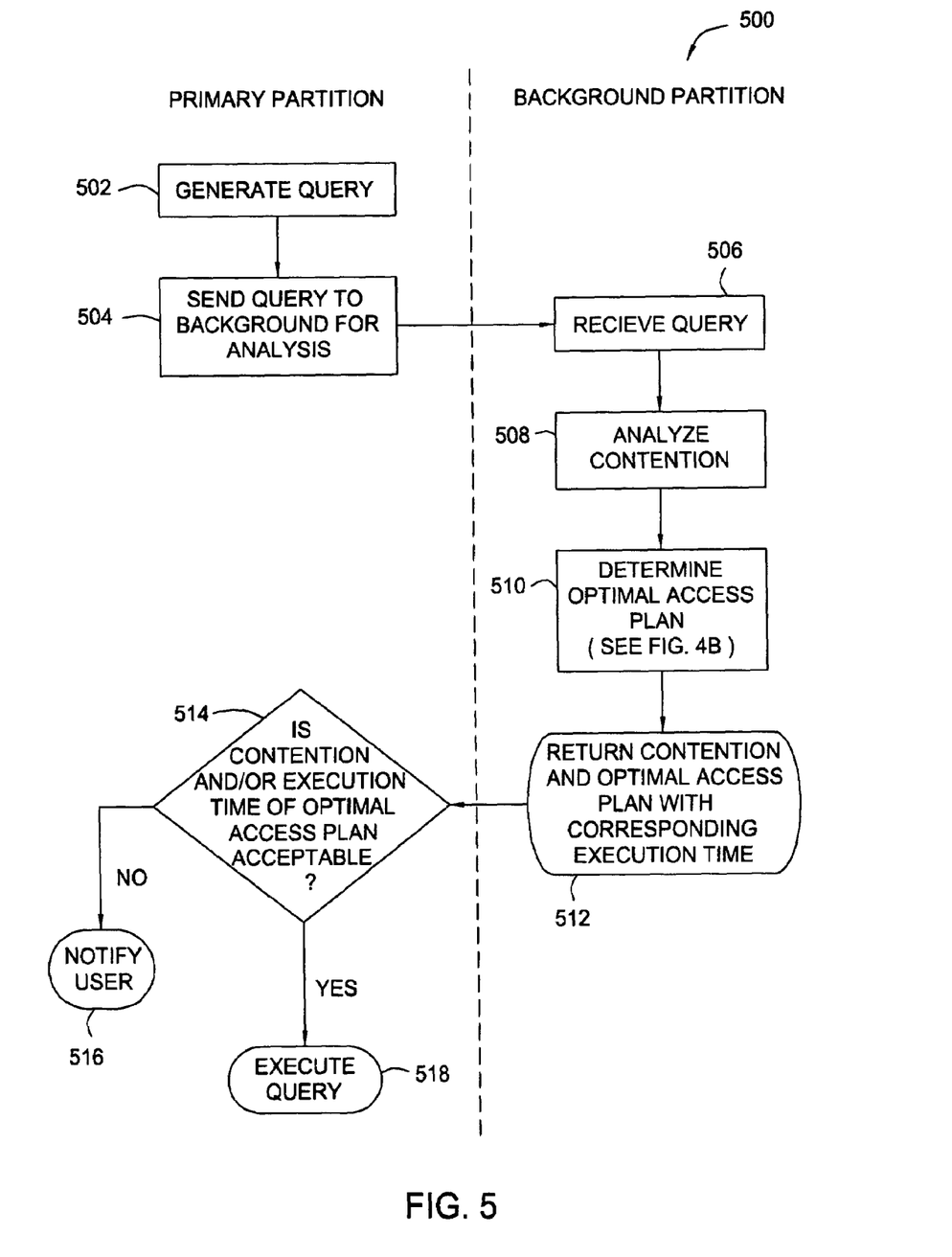
FIG. 5 is a flow chart illustrating exemplary operations for testing a query prior to execution according to one embodiment of the present invention.

FIG. 5 illustrates exemplary operations 500 that may be performed to analyze a query in a background partition prior to executing the query in a primary partition. The operations 500 begin at step 502 by generating a query in the primary partition. At step 504, the query is sent from the primary partition to the background partition for analysis. After the background partition receives the query, at step 506, the query is analyzed for contention, at step 508. For example, an amount of contention may be estimated by first parsing the query to identify the number of rows a statement might update or retrieve and lock. Then, by examining stored empirical (historical) data in the form of statistics of how long records from specific tables typically get locked, the contention time may be estimated. In addition to analyzing contention, an optimal access plan may also be determined at step 510 (e.g., by running the query with the different access plans as described with reference to FIG. 4B).

At step 512, the contention information and optimal access plan with the corresponding execution time is returned to the primary partition. It may be determined at the primary partition, at step 514, whether the contention and/or execution time is acceptable. If the values are acceptable, the query is executed at step 518. Otherwise, if the amount of contention and/or the execution time is too great, a user may be notified at step 516, for example, via a graphical user-interface (GUI) screen. The GUI screen may indicate the excessive contention and/or execution time and allow the user a number of options, such as executing the query anyway or suggesting the query be re-written more efficiently.

Conclusion

For some embodiments, executing a query in the background may result in determination of an optimal access plan with little impact on primary processing. This optimal access plan may then be used in later executions of the query, resulting in faster execution times and overall system performance. Queries may also be analyzed in the background prior to running them in the foreground, for example, to identify and avoid issuing queries with excessive execution times or queries resulting in excessively high contention.

While the foregoing is directed to embodiments of the present invention, other and further embodiments of the invention may be devised without departing from the basic scope thereof, and the scope thereof is determined by the claims that follow.

What is claimed is:

1. A method of optimizing the execution of queries in a logically partitioned system, comprising:
   monitoring queries executed in a primary processing environment, wherein the primary processing environment comprises a first set of logical partitions of the system wherein each logical partition in the first set of logical partitions is controlled by a respective operating system associated with the logical partition;
   selecting a query to be optimized, from the monitored queries;
   generating a plurality of access plans for the selected query; and
   determining an optimal access plan by executing the query in a background processing environment using the generated access plans, wherein the background processing environment comprises a second set of logical partitions of the system wherein each logical partition in the second set of logical partitions is controlled by a respective operating system associated with the logical partition; and
   in response to determining the optimal access plan, performing subsequent executions of the query using the optimal access plan.

2. The method of claim 1, wherein determining an optimal access plan comprises:
   repeatedly executing the query in the background processing environment using each of the plurality of access plans, recording a corresponding execution time for each; and
   selecting, as the optimal access plan, an access plan with a lowest corresponding execution time.

3. The method of claim 1, wherein determining an optimal access plan comprises:
   executing the query in the background processing environment using different ones of the plurality of access plans; and
   selecting, as the optimal access plan, an access plan with a corresponding execution time below a specified threshold execution time or an access plan with a lowest corresponding execution time.

4. The method of claim 3, further comprising halting execution of the query in the background processing environment using an access plan if a specified execution timeout period is exceeded.

5. The method of claim 1, wherein determining an optimal access plan comprises:
   performing multiple executions of the query in the background processing environment using the same access plan;
   for each of the multiple executions, recording a corresponding execution time; and
   selecting, as the optimal access plan, the same access plan only if none of the corresponding execution times exceeds a specified threshold execution time.

6. The method of claim 1, wherein:
   monitoring queries executed in the primary processing environment comprises storing executed queries in a cache; and
   selecting the query to be optimized comprises selecting, from the cache, the query based on the number of times the query has been executed.

7. The method of claim 5, wherein selecting a query to be optimized comprises selecting, from the cache, a query having a corresponding execution time above a predetermined threshold.

8. The method of claim 1, further comprising creating a query execution record for the selected query containing the optimal access plan.

9. The method of claim 8, wherein the query execution record also contains an execution time corresponding to the optimal access plan.

10. The method of claim 8, further comprising, subsequent to determining the optimal access plan:
detecting a request to execute the selected query in the primary partition;
obtaining the optimal access plan from the query execution record for the selected query; and
executing the selected query in the primary processing environment using the optimal access plan.

11. A method of executing queries in a logically partitioned system having at least one primary partition and at least one background partition, the method comprising:
receiving a query to be executed in the primary partition, wherein the primary partition is controlled by a first operating system;
analyzing the query in the background partition to generate one or more performance measures, wherein the background partition is controlled by a second operating system; and
executing the query in the primary partition only if the one or more performance measures fall within predefined performance criteria.

12. The method of claim 11, wherein analyzing the query in the background partition comprises estimating an amount of contention.

13. The method of claim 12, wherein estimating an amount of contention comprises:
parsing the query to determine portions of data accessed by the query; and
estimating an amount of contention based on stored statistics regarding the portions of data accessed by the query.

14. The method of claim 11, wherein analyzing the query in the background partition comprises determining an optimal access plan and corresponding execution time for the query.

15. The method of claim 11, further comprising generating a graphical user interface screen notifying a user if the one or more performance measures do not fall within the predefined performance criteria.

16. The method of claim 15, wherein the graphical user interface screen provides the user the option of executing the query.

17. A computer readable medium containing a program for optimizing query execution which, when executed by a processor, performs operations comprising:
monitoring queries executed in a primary processing environment, wherein the primary processing environment comprises a first set of logical partitions of a logically partitioned system wherein each logical partition in the first set of logical partitions is controlled by a respective operating system associated with the logical partition;
selecting a query to be optimized, from the monitored queries;
generating a plurality of access plans for the selected query; and
determining an optimal access plan by executing the query in a background processing environment using the generated access plans, wherein the background processing environment comprises a second set of logical partitions of the system wherein each logical partition in the second set of logical partitions is controlled by a respective operating system associated with the logical partition; and
in response to determining the optimal access plan, performing subsequent executions of the query using the optimal access plan.

18. The computer readable medium of claim 17, wherein determining an optimal access plan comprises:
repeatedly executing the query in the background processing environment using each of the plurality of access plans, recording a corresponding execution time for each; and
selecting, as the optimal access plan, an access plan with a lowest corresponding execution time.

19. The computer readable medium of claim 17, wherein determining an optimal access plan comprises:
executing the query in the background processing environment using different ones of the plurality of access plans; and
selecting, as the optimal access plan, an access plan with a corresponding execution time below a specified threshold execution time or an access plan with a lowest corresponding execution time.

20. A logically partitioned computer system, comprising:
at least one primary partition, wherein the primary partition is controlled by a first operating system;
at least one background partition, wherein the background partition is controlled by a second operating system;
a first executable component running on the primary partition configured to monitor queries executed in the primary partition, select a query to be optimized, from the monitored queries, and send the selected query to the background partition for determination of an optimal access plan; and
a second executable component running on the background partition configured to receive the selected query, generate a plurality of access plans for the selected query, and determine an optimal access plan by executing the query in the background partition using one or more of the generated access plans,
wherein, after the optimal access plan is determined, the first executable component is configured to perform subsequent executions of the query using the optimal access plan.

21. The logically partitioned computer system of claim 20, wherein the first executable component is configured to store monitored queries in a query statement cache and select, from the query statement cache, a query to be optimized based on the number of times the query has been executed.

22. The logically partitioned computer system of claim 20, wherein the second executable component is further configured to create, in a query execution table, a query execution record for the selected query containing the determined optimal access plan.

23. The logically partitioned computer system of claim 20, wherein the first executable component is further configured to, upon receiving a query to be executed, retrieve, from the query execution table, a corresponding optimal access plan.

* * * * *